United States Patent [19]

Nelson

[11] Patent Number: 4,628,483

[45] Date of Patent: Dec. 9, 1986

[54] ONE LEVEL SORTING NETWORK

[76] Inventor: Raymond J. Nelson, 2400 Demington Dr., Cleveland, Ohio 44106

[21] Appl. No.: 652,304

[22] Filed: Sep. 19, 1984

Related U.S. Application Data

[60] Division of Ser. No. 384,483, Jun. 3, 1982, which is a continuation of Ser. No. 73,640, Sep. 10, 1979, abandoned.

[51] Int. Cl.$^4$ .................................................. G06F 7/00
[52] U.S. Cl. .................................... 364/900; 340/146.2
[58] Field of Search ... 364/200 MS File, 900 MS File; 340/146.2

[56] References Cited

U.S. PATENT DOCUMENTS

| | | | |
|---|---|---|---|
| 2,984,822 | 5/1961 | Armstrong et al. | 364/900 X |
| 2,984,824 | 5/1961 | Armstrong et al. | 364/900 |
| 3,015,089 | 12/1961 | Armstrong | 364/900 |
| 3,029,413 | 4/1962 | O'Connor et al. | 364/900 |
| 3,273,127 | 9/1966 | Armstrong | 364/900 |
| 3,311,892 | 3/1967 | O'Connor et al. | 364/900 |
| 3,336,580 | 8/1967 | Armstrong | 364/900 |
| 3,418,632 | 12/1968 | Batcher | 340/146.2 |
| 3,428,946 | 2/1969 | Batcher | 340/146.2 |
| 3,587,057 | 6/1971 | Armstrong | 364/900 |
| 3,685,024 | 8/1972 | O'Connor | 364/900 |
| 3,931,612 | 1/1976 | Stevens et al. | 364/900 |
| 3,938,087 | 2/1976 | Louie | 340/146.2 |
| 4,131,947 | 12/1978 | Armstrong | 364/900 |

OTHER PUBLICATIONS

Donald Knuth, vol. 3/Sorting and Searching in *The Art of Computer Programming*, 1973, pp. 139-142 and 229-233.

Primary Examiner—Eddie P. Chan
Attorney, Agent, or Firm—Yount & Tarolli

[57] ABSTRACT

A sorting network is disclosed for sorting N records, N being greater than two, into a total order in accordance with the values of keys associated with each of the records. This sorting network includes as many two-input comparators as are required to compare, substantially at the same time, each of the keys of the records with each of the keys of the other records. Each comparator provides an indication as to the relative values of the two compared keys. A decoder network responds to these indications to determine therefrom the proper order of the records, and gates each of the input records onto an output line corresponding to the proper location of that record in the total order. In the disclosed embodiments, the records are comprised of binary data including plural bits. Embodiments are disclosed for sorting serially by bit and in parallel at least two bits at a time.

3 Claims, 14 Drawing Figures (2A)

(2B)

ONE LEVEL SORTING NETWORK

This is a division of U.S. patent application Ser. No. 384,483, filed June 3, 1982, (pending), which in turn is a continuation of U.S. patent application Ser. No. 073,640, filed Sept. 10, 1979, (now abandoned).

BACKGROUND AND FIELD OF THE INVENTION

The present invention relates to apparatus for use in a data processing system for sorting a plurality of arbitrary length data records into a desired order.

The layman typically thinks of modern day digital computers as devices for performing extensive numeric calculations, such as are involved in determination of the orbits of artificial satellites, engineering and geophysical calculations, etc. In point of fact, however, an extensive portion of the total amount of available computer time is used, not in computations, per se, but rather in ordering and reording large files of arbitrary data, such as customer list, inventory data, etc. Current users, themselves, estimate that such sorting operations typically account for more than 25% of data processing and computation time in typical installations.

The data to be sorted is generally arranged in a file, consisting of a large number of individual records. These records include portions, which will be referred to hereinafter as keys, used to sort the data. A sorting operation involves the arrangement of all of the records in the file so that the keys of the files on the list are in numerical order. The file may, for example, incorporate data corresponding to a group of individuals, with each record including data for a single individual. In this example, the keys for each record may be the individual's name (in digital form, of course). The ordering of the records by key would then result in the file being arranged so that the individual's names are in alphabetical order.

Sorting techniques may be separated into two categories. In software sorting techniques, the central processor, itself, examines each record and inserts it at the appropriate place in a list of such records. Various programs embodying a number of well-known algorithms have been devised for performing such internal sorting operations (e.g., quick sort, bubble sort, bitonic sort, etc). All such programs are quite costly and consume large blocks of central processor time, in view of the general necessity for the processor to perform only a single operation at any given time. The second category involves the use of a hardware module for performing the sorting function. In operation, the sorting module will first be loaded with a file of records from the computer mass storage, after which the module will be triggered to perform the sorting operation. The sorting module will then sort the file of records in accordance with the keys, after which the sorted files will be returned to mass storage for use by the central processor. A large number of patents have issued directed to various peripheral sorting modules, including the patents to O'Conner et al., U.S. Pat. Nos. 3,029,413 and 3,311,392, Armstrong, U.S. Pat. Nos. 3,273,127; 2,984,822; 2,984,824; 3,013,249; 3,015,089; 3,329,938; 3,329,939; and 3,336,580, as well as the patents to Chen et al., U.S. Pat. No. 4,078,260 and O'Connor, U.S. Pat. No. 3,685,024.

The most common method disclosed in these patents relates to the use of a two-line sorting module, wherein two records are presented serially, the most significant bit first, to the input of the module. The sorting module gates the two records onto output lines so that the record having the higher key appears on a designated "HIGH" output and the record having the lower key appears on a designated "LOW" output. N-line sorters are formed from networks of these two-line sorting modules. In general, each of these networks utilizes two or more cascaded tiers of two-line sorting modules, so that the total amount of time necessary to perform the sorting operation increases with the number of lines into the sorter. Thus, for example, if the delay time required for operation of a two-line sorter module is defined as being one unit delay, then an optimal network for a three-line sorter will require a three unit delay.

Hence, the larger the number of input lines into the sorter network, the more complicated the network becomes, and the greater the amount of time required to complete the sorting function. Often, the size of the file to be sorted is much larger than the number of lines into the sorter network, requiring that the central processor sort groups of this file in iterative fashion. The actual amount of time required to sort a given file may therefore be many times the delays listed above. The number of sorter passes required in order to sort a given file may be reduced by increasing the number of lines into the sorter network, however this increases the delay within the sorter network itself. Clearly, an optimum sorter network will have an arbitrary number of input lines, and a very short delay associated with it.

SUMMARY OF THE INVENTION

It is an object of the present invention to provide a sorter network which may be designed to have any arbitrary number of input lines N, without substantially increasing the delay time required for the network to perform the sorting functions, beyond that delay required for a two-input sorting module.

To accomplish this goal, the present invention provides a one-level sorting network for sorting N input records, where N is greater than two. This sorting network includes as many two-input comparators as are required to compare each of the data records with every other of the data records. Each comparator provides an output indicating which of the two input records is the greatest. A decoder network is provided which receives the output from all of the comparators, determines the proper order of the records from the results of all of these comparisons, and gates the incoming records onto a corresponding number of output lines in the desired order.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Before proceeding on with a detailed description, it will be useful to first review the nature of the signals being sorted, in order to clarify terminology and to provide a better understanding of the nature of the sorting process which takes place.

The information to be sorted comprises a plurality of records which together represent a file. Each of the records will include a large number of alphanumeric characters. In general, the characters of each record will be grouped in a number of different fields carrying different types of information. Thus, one field may carry an individual's name, whereas other fields could carry such other information as, for example, age, address, magazine subscription information, etc.

The purpose of the sorting devices which will be described hereinafter is to rearrange the order of the records within the file so that the information carried in one of the fields in each of the records, known as the "key", falls into a nondecreasing (monotonic) sequence. The key may be selected to be an individual's name, for example, in which case the resulting sorted file will be arranged so that the individual's name will fall into an alphbetical sequence.

Of course, the central processor does not retain information in the form of alphanumeric characters, per se, but rather stores them and operates upon them in digital form. Hence this sorting operation essentially sorts the records so that the binary representations of the keys stored within the computer fall within a nondecreasing numerical order.

Prior Art Sorting Networks

Figure 1:
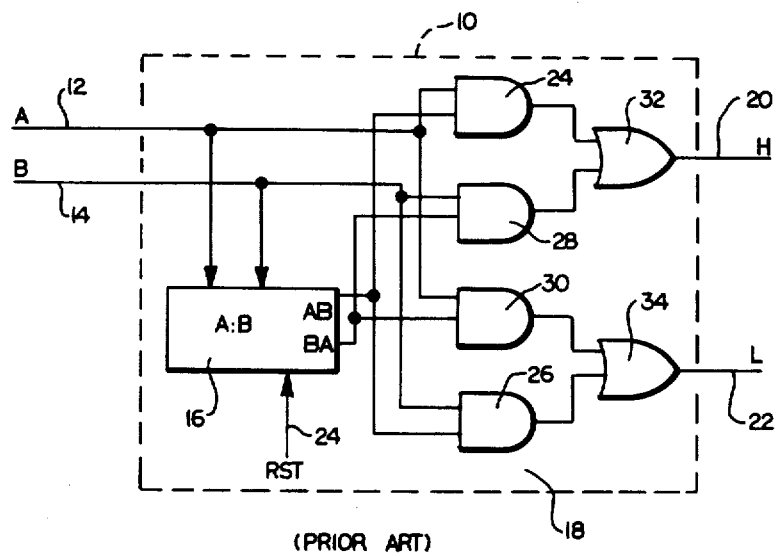
FIG. 1 is a block diagram of a two-line sorting module in accordance with the teachings of the prior art.

Referring now to FIG. 1, there is shown a prior art two-line sorting module 10, such as disclosed in the U.S. patent to O'Connor et al., U.S. Pat. No. 3,029,413. In this drawing and others hereinafter, certain timing lines have been omitted. Such timing lines are often provided at selected places in the circuit for synchronizing the operation of the various stages of the sorter. This is all quite conventional, however, and hence will be deleted to simplify the description.

The two records to be sorted are applied serially along input lines 12 and 14, with the keys being applied, most significant bit first, prior to the remainder of the record. The sorting module 10 includes a comparator 16 which compares the keys of the two input records bit by bit, as they are applied to the inputs 12 and 14, and provides outputs which control a gating network 18 to gate the record containing the higher key to an output line 20 (H), and the lower to an output line 22 (L).

More specifically, the comparator 16 includes two outputs designated in FIG. 1 as AB and BA. These two outputs will always having opposing logic levels. Thus, if output AB is high (i.e., at a logic "1") then output BA will be low (i.e., at a logic "0"). These outputs will be reset to an initial value by a reset line 24 prior to the application of the two records to the input lines 12 and 14. The initial state into which the comparator is reset is unimportant in terms of the later operation of the device, and for purposes of discussion it will be assumed that the output AB is reset high, hence output BA is reset low. This will set the gating matrix 18 so that one record is gated to one line, and the other to the other line. More specifically, the AND gates 24 and 26 will be enabled, whereas AND gates 28 and 30 will be disabled. The A input will then be gated onto output line H by AND gate 24 and OR gate 32, whereas the B input will be gated to output line L by AND gate 26 and OR gate 34.

As long as the bits of the key presented to the comparator 16 along the input lines 12 and 14 are equal (i.e., as long as they are both logic "1" or both logic "0") then then comparator circuit 16 remains unaffected. If a logic "1" appears at one input, but not at the other, however, the comparator 16 will lock the two outputs lines AB and BA into a state indicating which of the two records included this logic "1". The comparison will then have been completed for these two records, and the gating matrix 18 will have been set into a state such that the input records are appropriately gated to the H and L output lines.

In FIG. 1, and in the figures which follow, the designators for the output lines of comparator modules will be comprised of two letters, each representing a record supplied to one of the two-input lines of that comparator. A logic "1" will appear at a given output line when the input record represented by the first letter of the designator for that output line includes the key having the greater magnitude of the two inputs. Thus, a logic "1" will be locked into the AB output when the key of the A input has the greater magnitude, whereas a logic "1" will be locked into the BA output when the key to the record appearing on the B input has the greater magnitude.

The operation of the two line sorter module 10 of FIG. 1 will perhaps be more readily understood through consideration of the following example. In this example, it is assumed that the key associated with the record applied to input line A is "11000001", and the key associated with the record supplied to input line B is "11001001". As stated previously, these keys are supplied to the input line serially, most significant bit first, prior to the application of the remainder of the record to the input lines. Furthermore, the comparator 16 will be reset by a signal applied to reset line 24 so that output line AB is high, and output line BA is low. Since the comparator does not respond as long as the signal supplied along lines A and B are equal, the comparator will remain unchanged through the application of the first four bits of the keys, in the example being disclosed. It will be noted, however, that the fifth bit of the two keys are not equal. Instead, the fifth bit of the key to record B is a "1", whereas it is a "0" in the key to record A. Consequently, the magnitude of the B key is greater than the magnitude of the A key, and the comparator will latch the output into the state where output BA is now high, and output AB is low.

Since the output line AB is now low, AND gates 24 and 26 will be disabled, AND gates 28 and 30 will instead be enabled by the high signal upon output line BA. The record on line B will thus be gated through OR gate 32 by AND gate 28, and will appear upon the H output, rather than the L output as previously. Similarly, the A record will be gated to the L output by AND gate 30 and OR gate 34. It will be recognized that, though the gating of the signals changes in the middle of the key, the output signals appearing along lines H and L correspond exactly with records B and A, respectively, since the part of the record occurring prior to the switching of the switching matrix 18 was identical for the two records. Thus, the two line comparator module 10 of FIG. 1 accomplishes the gating of the two input records onto the H and L output lines, without affecting the signals themselves.

FIGS. 2A and 2B illustrate fashions in which these two-line comparator modules have in the past been cascaded to provide sorting switches having three, four, or more inputs. In FIG. 2A, three, two-line sorting modules 36, 38 and 40 are cascaded to provide a three input sorting switch. Sorter 36 sorts the input records A and B and provides the higher of the two along the output line H. The lesser of the two records, appearing on output L of sorter module 36, will then be compared with input C in the sorter module 38. Since the L output of module 36 corresponds to the lesser of records A and B, the output of module 38 represents the lesser of all three inputs, and is thus the lowest of all three input records A, B and C. The output H of module 38 does not, however, necessarily represent the middle of the three inputs, since it is possible that the record applied along input line C is the greatest of the three records. Consequently, it is necessary to compare the H output of module 38 with the H output of module 36 to determine which of the two is the greatest record. Sorter module 40, which performs this function, thus provides on its H output the greater of all three inputs, whereas the L output of that module represents the intermediate valued record M.

In FIG. 2B, five two-line sorter modules 42, 44, 46, 48 and 50 are cascaded so as to generate a four input line sorting switch. The operation of this sorting switch is completely analogous to the three input line sorting switches of input A, and will not be described in detail hereinafter. The aforementioned patent to O'Connor et al., U.S. Pat. No. 3,029,413, discloses and describes this embodiment, and reference may be had thereto in the event that a more detailed description is desired.

FIGS. 2A and 2B represent what has become a universally accepted method of generating N-line sorter modules; that is, by cascading two or more two-line sorter modules. Although this technique clearly accomplishes the goal of sorting N input records onto N output lines, it suffers the disadvantage of requiring that a number of modules be cascaded one after another, thereby multiplying the amount of time required by the sorting operation. In both sorters of FIGS. 2A and 2B, three unit delays are required to perform the sorting of the input records, taking now the "unit time" as being the time delay embodied in the two-line sorter module of FIG. 1. For sorting switches for parallel sorting of larger numbers of input records, of course, larger arrays of two-line sorting modules must be provided, generally requiring longer and longer times to achieve the sorting function. The table below indicates the fashion in which the delay time increases with the number N of lines into the sorter network.

TABLE I

| N: | 1 | 2 | 3 | 4 | 5 | 6 | 7 | 8 ... |
|---|---|---|---|---|---|---|---|---|
| Unit Delays: | — | 1 | 3 | 3 | 5 | 5 | 6 | 6 ... |

These delay times, although quite short by human standards, are quite large in comparison to the amount of time required for individual computer operations, and become rapidly larger when these sorting modules are used in iterative, repetitive operations to sort large files of records. Consequently, it would be desirable to provide a system for sorting N records, which did not engender more than a single unit delay, regardless of N.

One Level Sorting Network

Figure 3:
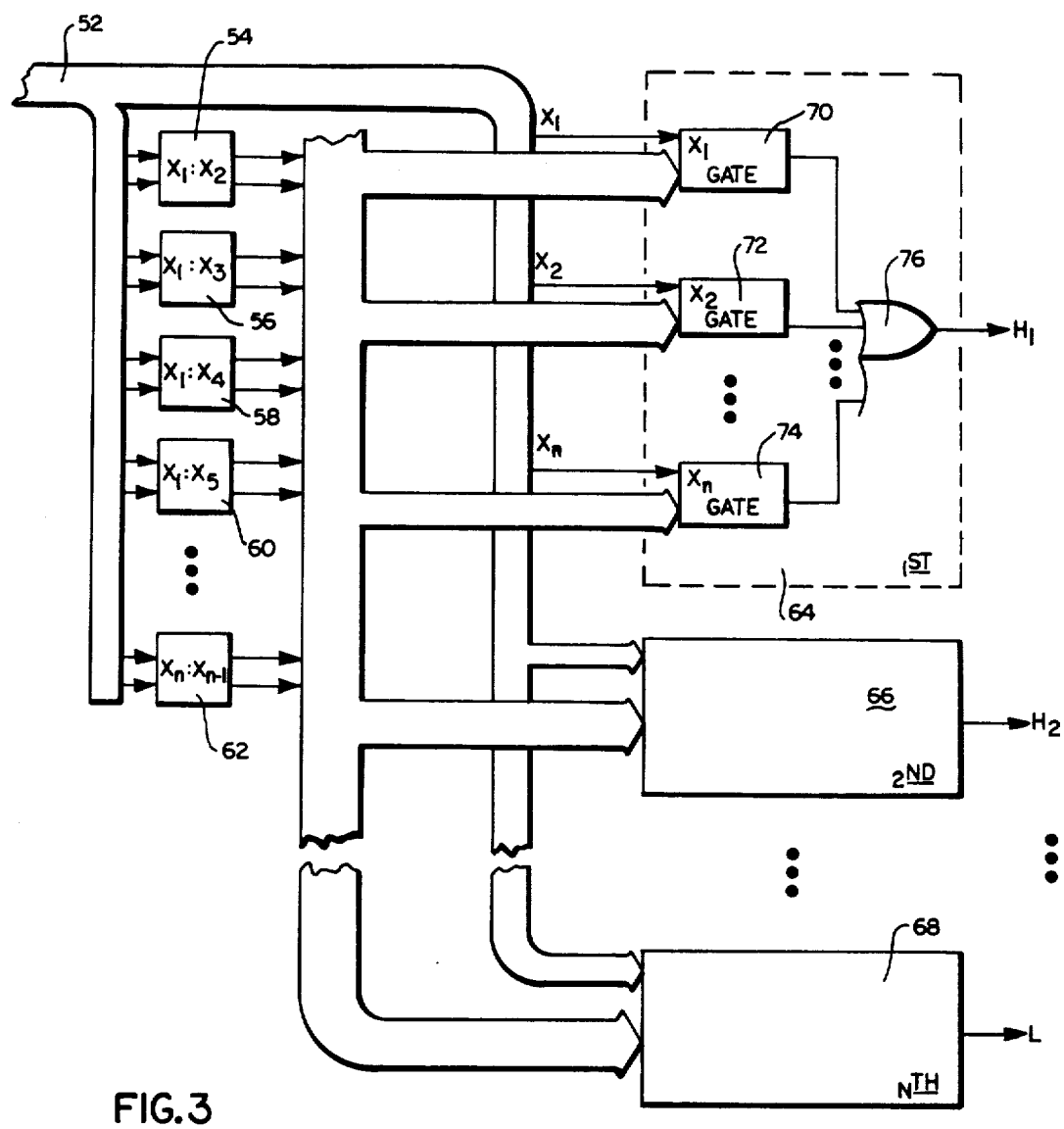
FIG. 3 is a block diagram of a one-level sorting network in accordance with the teachings of the present invention.

FIG. 3 illustrates in block diagram form the general approach taken in accordance with the teachings of the present invention to provide a sorter system capable of hardware sorting of N input records, while requiring no greater than a one-unit delay time, again using the term "unit time" as defined above. In FIG. 3, the N input records are again applied serially to N input lines. For convenience of description and illustration, these lines are not shown separately. Instead a bus 52 represents these N input lines, each carrying its associated records $X_1$-$X_n$. A number of comparators, each similar to the comparator 16 of FIG. 1 are provided. Each of these comparators has two of the N records applied to its two inputs. As illustrated in FIG. 3, comparator 54 will compare input records $X_1$ and $X_2$. Similarly, comparators 56, 58 and 60 will respectively compare record $X_1$ with each of records $X_3$, $X_4$ and $X_5$. Each comparator will latch its outputs into an appropriate one of two states, depending upon the relative magnitudes of the keys associated with the compared records. Enough comparators must be provided so that each of the input records is compared with each of the other input records. From number theory, then, the number of comparators required to perform this will be $N(N-1)/2$; i.e., a combination of N items, taken two at a time.

Since the outputs of these comparators completely describe the relative magnitudes of each pair of input records, it is necessary only to examine these outputs to determine the total order of all of the input records. To this end, the outputs of the various comparators are supplied to a number of decoder circuits 64, 66, . . . 68. In general, N of these decoder circuits will be provided, each one corresponding with an associated order of record (i.e., first highest, second highest, etc.). Since N different records are provided, then N different decoders will be required.

As illustrated in FIG. 3, each of the decoders 64, 66, etc., will include gates 70, 72, . . . 74, each of which will be enabled to pass a corresponding one of the N records when the output lines of the various comparators 54, 56, 58, etc. have a certain form. If, for example, the output lines of the comparators indicate that in each comparison of record $X_1$ with every other record, the record $X_1$ appeared as the larger of the two records, then record $X_1$ is the first highest of the N records, and should appear on output line $H_1$. In this event, gate 70 will be enabled and the record $X_1$ will be gated to gate 70 and on to the output line $H_1$ by the OR gate 76. In general, the gate for whichever of the records has the greatest key will be enabled to pass that record to output line $H_1$ by the OR gate 76. Obviously, only one of the AND gates 70, 72, 74 will be enabled at any given time.

Similarly, decoder 66 will include AND gates for decoding those conditions under which each of the various input records is the second highest record, and will gate the appropriate one of these records onto the output line $H_2$. Each of the N decoders will include similar circuitry, up to and including the Nth decoder 68 which will also include AND gates and will gate the lowest of the N records onto the output line L.

As a general matter, an input record $X_i$ will be Kth highest if $K-1$ of the keys of the other records are greater than the key associated with record $X_i$, and $N-K$ keys are smaller. It is the function of each of the record gates to determine the existence of this condition for the associated record.

Figure 4:
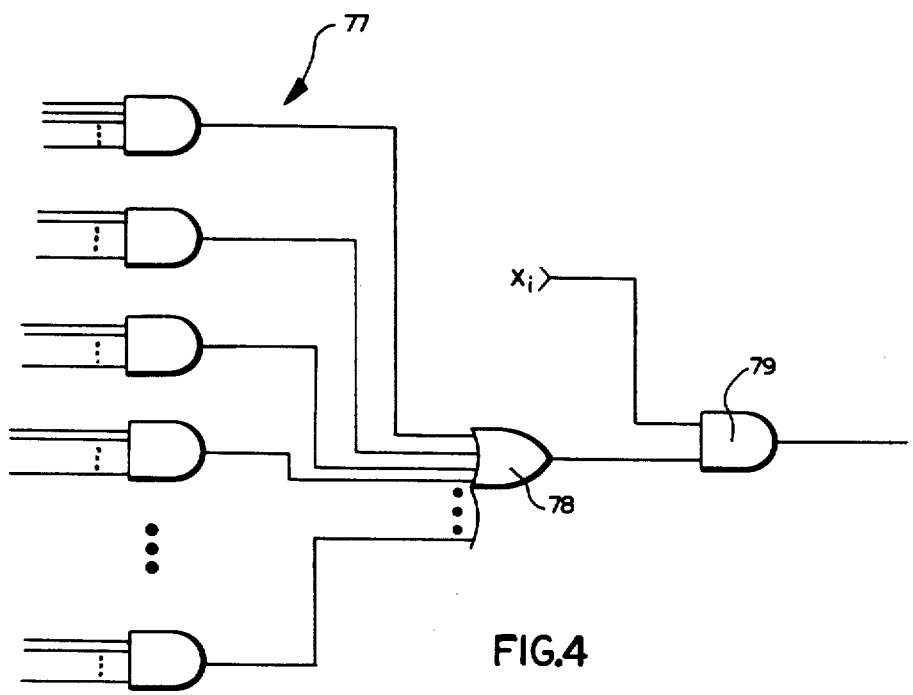
FIG. 4 is a more detailed block diagram of one of the record gates of FIG. 3.

FIG. 4 illustrates one form which the ith record gate for the kth decoder could take. In this embodiment, the record gate includes a plurality of AND gates 77, an OR gate 78 for combining the outputs of all of AND gates 77, and another AND gate 79 which will be enabled to pass the $X_i$th record whenever the output of OR gate 78 is high.

The inputs to gates 77 are derived from comparator outputs. Each of the comparators comparing record $X_i$ with another of the N records will have one or the other of its inputs connected to an input line, for each of AND gates 77. Since there are $N-1$ of these comparators, then each of AND gates 77 will have $N-1$ inputs. Of these $N-1$ inputs, $K-1$ will be derived from the comparator outputs carrying high signals when the key to record $X_i$ is smaller than the key to the record with which it is being compared, whereas the remaining inputs to the AND gate will be derived from those comparator outputs carrying high signals when the key to record $X_i$ is greater than the key to the record with which it is being compared. Consequently, all of the inputs to a given one of the AND gates 77 will be high only when the key to record $X_i$ is smaller than the keys to $K-1$ of the other records, but greater than the remaining ones. As brought out above, however, this is precisely the condition in which the record $X_i$ is the kth highest of the records. In this event, the high signal then appearing at the output to the respective AND gate 77 will pass through OR gate 78 and enable the passage of record X through AND gate 79. Each of AND gates 77 will have a different combination of the two outputs of all of the $X_i$ comparators as inputs thereto, selected consistent with the constraints described previously, to cover a different instance in which record $X_i$ is the kth highest of all N records.

AND gates 77 will be numerous enough to cover all possible combinations of comparator outputs wherein the key to record $X_i$ is indicated to be smaller than $K-1$ of the other keys and greater than the remaining keys. Consequently, if the record $X_i$ is the kth highest record, then the output of one of the AND gates 77 will be high, thereby enabling the passage of record $X_i$ through AND gate 79.

Figure 5:
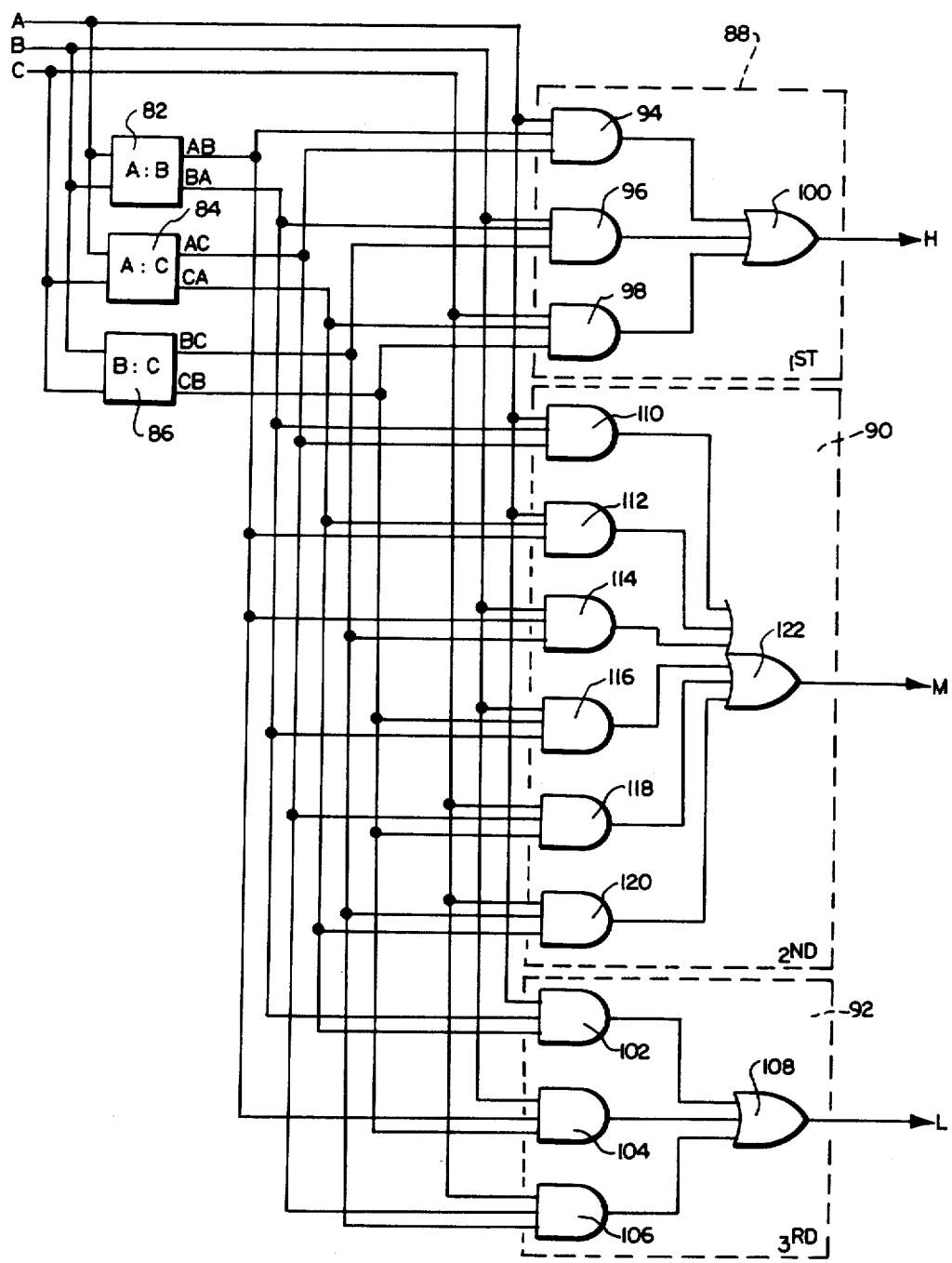
FIG. 5 is a more detailed block diagram of a three input, one-level sorting network in accordance with the teachings or the present invention.

FIG. 5 illustrates one specific example of a three input line sorter module employing the general concepts of the invention illustrated in FIG. 3. In FIG. 5, three comparators 82, 84 and 86 are required to compare each of the input records with each of the other input records. Comparator 82 compares input records A and B, comparator 84 compares input records A and C, and comparator 86 compares input records B and C. The various outputs of the three comparators 82, 84 and 86 are directed to the three decoder circuits 88, 90 and 92 for appropriate control in the gating of the three input records onto the three output lines.

Decoder 8 includes three AND gates 94, 96 and 98, each corresponding to one of the record gates 70, 72, etc. of FIG. 3. AND gate 94 will be enabled when the output AB of comparator 82 is high, indicating that record A has a key which is greater than record B, and the AC output of comparator 84 is high, indicating that the key of record A is also greater than the key of record C. When this occurs, then record A is the greatest of the three, and is enabled to pass to the OR gate 100 via the AND gate 94. Of course, in this circumstance, AND gates 96 and 98 will be disabled by the signals appearing on one or more of their inputs. AND gate 96, for example, will be disabled by the low signal appearing on output BA of comparator 82, and AND gate 98 will be disabled by the low signal appearing on output line CA of comparator 84.

In similar manner, gate 96 will be enabled to pass record B when the outputs BA and BC of the comparators are high, indicating that record B has the greatest key. AND gate 98, on the other, will be enabled when the outputs CA and CB of the comparators are high, indicating that record C has the greatest of the three keys. In any event, one of the three AND gates 94, 96, 98 will be active, and the other two will be disabled, hence one of the three input records (the greatest) will be gated to the output line H.

The third decoder module 92 operates in a similar manner, gating one of the three input records through a corresponding one of three AND gates 102, 104, 106. The outputs of these gates are joined by an OR gate 108. The A record will be gated via AND gate 102 if both output lines CA and BA are high, indicating that the key of record A is lower than the key of both records B and C. Similarly, AND gate 104 will pass record B in the event that outputs AB and CB are high, indicating that the key of record B is smaller than the keys of both records A and C. Finally, AND gate 106 will gate record C onto the output line L if the comparator outputs AC and BC are high, indicating that the key of record C is smaller than the keys of both records A and B.

The second decoder 90 is somewhat more complicated than the decoders 80 and 92, in that each of the records may be the middle record in either of two cases. For example, record A will be the middle record if comparator output lines BA and AC are high, or if comparator lines CA and AB are high. In either case, the key associated with record A will be intermediate the keys associated with the other two records. The two AND gates 110 and 112 decode these two conditions, and correspond with the A gate for this decoder. Similarly, AND gates 114 and 116 represent the B gate for decoder 90, whereas AND gates 118 and 120 represent the C gate for decoder 90. As with the other two decoders, only one of the AND gates 110–120 will be enabled at any given time, hence only one of the three input records will be gated to the output via the OR gate 122.

It can be seen both in the specific example illustrated in FIG. 5, and in the more general illustration of FIG. 3, that the number of input lines to this comparator module may be extended indefinitely without substantially increasing the delay time of the module. In all cases, regardless of N, the delay time will approximate the unit delay time. Thus, the approach illustrated in FIGS. 3 and 4 accomplishes the desired result of increasing the speed with which the sorting operation may be accomplished.

Figure 6:
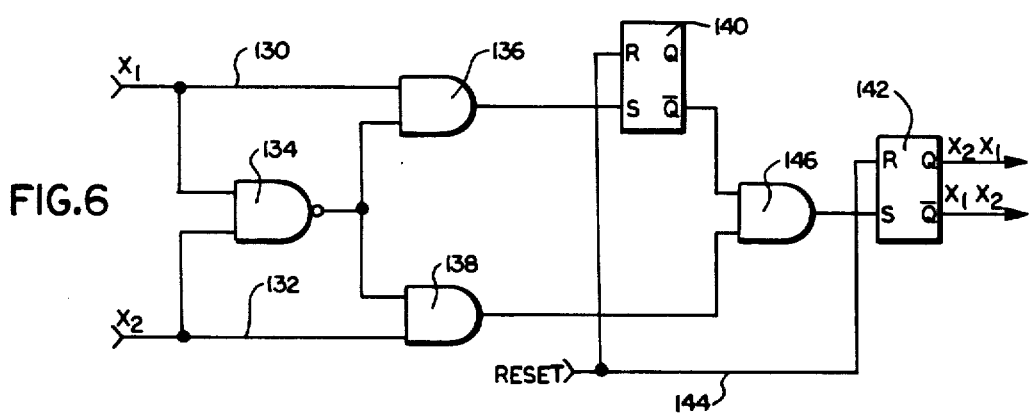
FIG. 6 is a circuit schematic of a two-input comparator which may be used in the sorter networks of FIGS. 3 and 5.

FIG. 6 illustates one form which the comparators used in the circuitry of FIGS. 3 and 4 could take. This comparator is essentially the same as that set forth in the previously referenced patent to O'Connor, and it is set forth herein for completeness, and only as an example of one form which this comparator circuit may take.

In FIG. 6, the two records to be compared ($X_1$ and $X_2$) are applied respectively to input lines 130 and 132. A NAND gate 134 monitors the bits of the two input records 130 and 132 and provides a low output signal whenever both are high. The low output of NAND gate 134 disables two AND gates 136 and 138, preventing the outputs thereof from rising to a high level. In the event that one or both of the bits of the records applied to the lines 130 and 132 is low, however, then the output of NAND gate 134 will shift to a high level, thereby enabling both AND gate 136 and AND gate 138. Therefore, if a high level is present upon one (and only one) of the input lines 130 and 132 that high level will be gated to the output of the corresponding AND gate 136 and 138. This high level signal will then trigger one of two RS flip-flops 140 or 142.

These two flip-flops 140 and 142 will have initially been placed in a reset condition by a reset signal applied to a reset line 144, prior to the application of the records to the input lines 130 and 132. When reset, the Q output is low and the $\overline{Q}$ output is high. Consequently, flip-flop 142 will have been placed in an initial condition wherein the output $X_1 X_2$ is high and the output $X_2 X_1$ is low. Additionally, since the Q output of flip-flop 140 is high, and AND gate 146 coupling the output of AND gate 138 to the set input of flip-flop 142 will be enabled.

If a high logic signal first appears at the output of AND gate 138, then this high signal will set flip-flop 142, changing the state of its output (i.e., the Q line will go high and the $\overline{Q}$ line will drop low). Flip-flop 142 will then remain in this condition until reset by a reset signal applied to reset line 144 prior to the application of the next records to be sorted thereto.

If the high level first appears at the output of AND gate 136, however, then flip-flop 140 will instead be set, thus disabling AND gate 146 and preventing any further positive levels from being transmitted to the set input of flip-flop 142 from AND gate 138. Consequently, flip-flop 142 will thereafter remain in a reset condition, wherein the $X_1 X_2$ output is high and the $X_2 X_1$ output is low. To once again summarize the operation of this circuit, then, after being reset by the reset signal supplied to line 144, the two records will be applied bit by bit, the most significant bit first, to the input lines 130 and 132. If the two bits presented thereto are both high, then the comparator will be disabled by NAND gate 134. When a high level appears at one input and not at the other input, the high level will be transmitted to the output of the corresponding AND gate 136 or 138 and will either set flip-flop 142, or will lock flip-flop 142 into a reset condition by disabling AND gate 144 through the setting of flip-flop 140. Whether flip-flop 142 is set or reset will depend upon which of the inputs the high level first appeared on, and hence will directly reflect which of the two keys is the greater.

Figure 7:
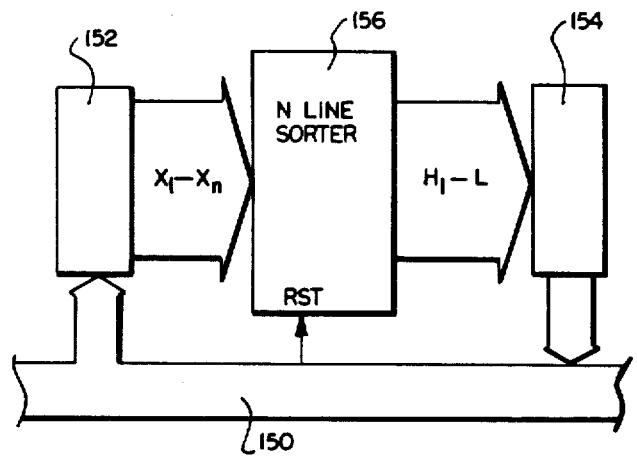
FIG. 7 is a block diagram of a system utilizing an N-line sorter network.

FIG. 7 illustrates in broad block diagram form one manner in which an N line sorter in accordance with the teachings of the present invention could be used in a data processing system. In this figure, the data, control and address busses of the data processing system are represented at 150. These busses are connected to input and output buffers 152 and 154, respectively, which convert the words provided in parallel along the bus 150 into the serial form required by the sorter 156.

Figure 8:
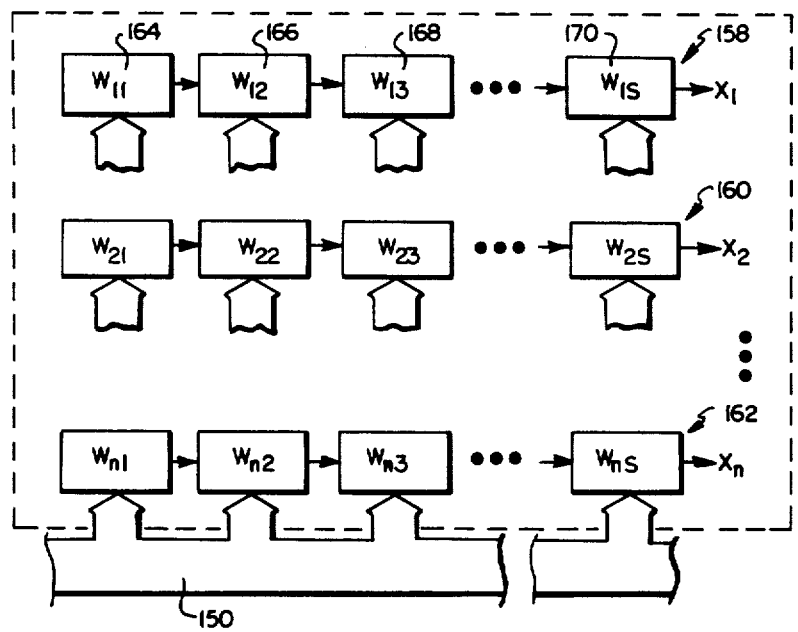
FIG. 8 is a block diagram of the input buffers to the sorter network of the system of FIG. 6.

One form which the input buffer could take is illustrated in FIG. 8. In this figure, it will be seen that N different parallel-input, serial-output record buffers 158, 160 . . . 162 are provided. Each of these record buffers comprises S different word buffers 164, 166, 168 . . . 170, each of which has sufficient capacity to store a single one of the words presented along the bus 150. In practice, each of these record buffers will be loaded one word at a time in parallel from the bus 150. After all of the records are loaded into the word buffers, the N line sorter 156 (FIG. 7) will be reset by a signal applied to its reset input. Appropriate clock signals will then be applied in synchronism to each of the record buffers, shifting the parallel loaded records in the record buffers out to the N line sorter module 156 one bit at a time, and in synchronism with one another. Of course, as stated previously, the records will be loaded so that the key will be shifted into the sorter 156 first, with the most significant bit leading. The N line sorter 156 will then connect each of the input lines $X_1-X_n$ to an appropriate one of the output lines $H_1-L$, with the connections being determined by the magnitude of the keys associated with the individual records, in the manner which has been described previously. The records will thus be sorted and will appear on the N output lines to be shifted into the output buffer 154.

The output buffer 154 may take any appropriate conventional form, and generally will be similar to the input buffer, shown in FIG. 8, except that the words will be serially shifted in, rather than out, and that they will be read out onto the bus 150, rather than being loaded therefrom in the fashion of the input buffers 152.

When a file to be sorted includes more than N records, the data processing arrangement may be programmed so as to sort these records N at a time in a conventional iterative sequence. If it is desired to provide entirely hardware (as opposed to software) sorting of a large number of input records through use of sorters having fewer input lines, than the N line sorter modules which have been described hereinbefore may be cascaded in a form which is much similar to the form in which two line sorter modules have been cascaded in the past.

Figure 2:
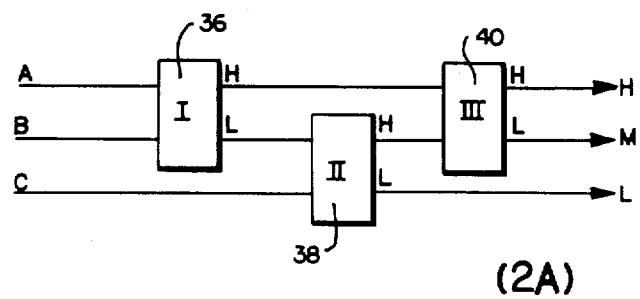
FIGS. 2A, and 2B are block diagrammatic illustrations, respectively, of three and four input sorter networks comprised of two-input sorter modules.
Figure 2:
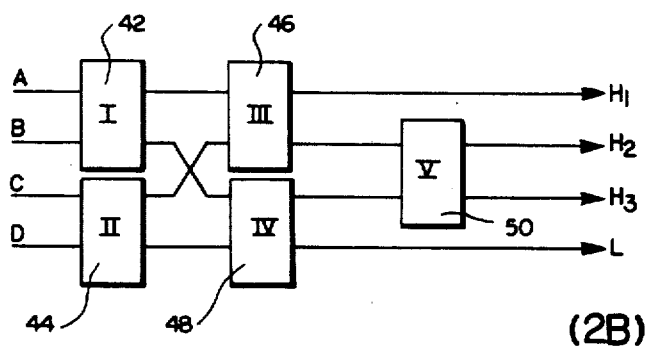
Figure 9:
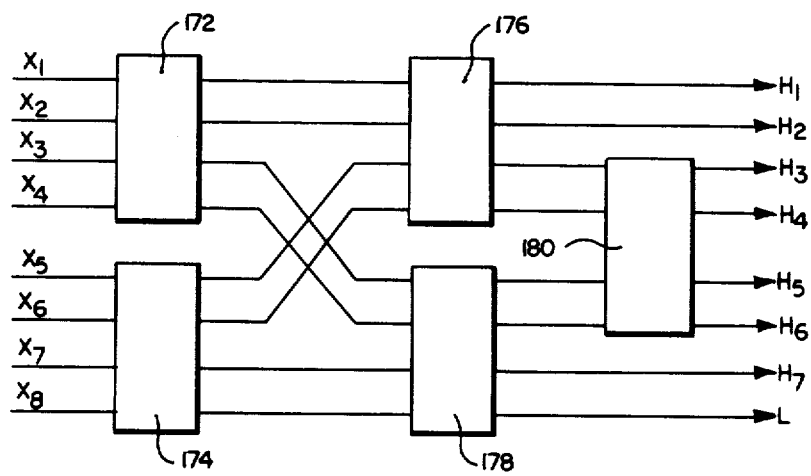
FIG. 9 is a block diagram of a sorter network comprised of four input, one level sorter networks illustrating the fashion in which these one level sorter networks may be cascaded, as with two input sorter modules.

FIG. 9 illustrates the example in which four line sorters are cascaded to provide sorting of eight different input records. It will be seen from FIG. 9 that five different four line sorters 172, 174, 176, 178 and 180 are required to perform this sorting function. Of course, the FIG. 9 embodiment is somewhat disadvantageous as compared to an eight line, one level sorting module as could be constructed as in accordance with the general teachings of the FIG. 3 embodiment, in that three unit delays are required to sort the input records, as opposed to only a single delay for the embodiment of FIG. 3. This embodiment does have the advantage, however, of achieving the sorting of eight input records with somewhat diminished complexity as compared to that which will be required with the eight line, one level sorter embodiment. It should be noted that the FIG. 9 embodiment is faster than an embodiment wherein the four line sorting modules 172-180 each comprised a number of cascaded two line sorting modules such as shown in FIG. 2B, since the four line sorting modules of FIG. 2 includes three unit delays as opposed to the one unit delay required by the four line, one level sorting modules 172-180 of FIG. 9.

It will in general be recognized that any N line, one level sorting module in accordance with the teachings of the present invention may be cascaded with plural other modules in a fashion completely analogous to that of two line sorting modules so as to achieve simultaneous sorting of a larger number of input records than are provided for by that N line, one level sorter module, by itself.

In the embodiments which have heretofore been described, the records are sorted serially by bit, i.e., at any given time only one bit of each record is being compared with the corresponding bit of each other record. The sorting operation need not take place in this serially by bit fashion, however. Instead, sorting may be accomplished serially by byte, or even by word. Since, in these cases, more than one bit of each record will be compared at any given time with the corresponding bits of the other records, the sorting will take place at a much faster pace than in the serially by bit embodiment. The circuitry is, however, correspondingly more complex.

The general configuration of an embodiment for sorting records serially by byte would have the same general configuration as illustrated in FIG. 3. The comparators 54, 56, 58, 60 . . . 62 would, however, in this event compare bytes, rather than bits. Also, the gates 70, 72, . . 74, 76 would, of course, function to gate the records by byte, rather than by bit. In this embodiment, as in previous embodiments, the comparators 54, 56, 58, 60 . . 62 would be reset prior to the initiation of a sorting function. Thereafter, the records would be presented along the bus 52, with a corresponding byte of each record being presented along this bus at any given time. As before, the records will be presented key first, with the most significant byte leading. The comparators will compare the magnitudes of the two bytes presented at the input, and will provide an output indicating which of the two is the greater. As with the FIG. 3 embodiment, it will be expedient if the comparator provides two outputs which are the logic inverse of one another.

Figure 10:
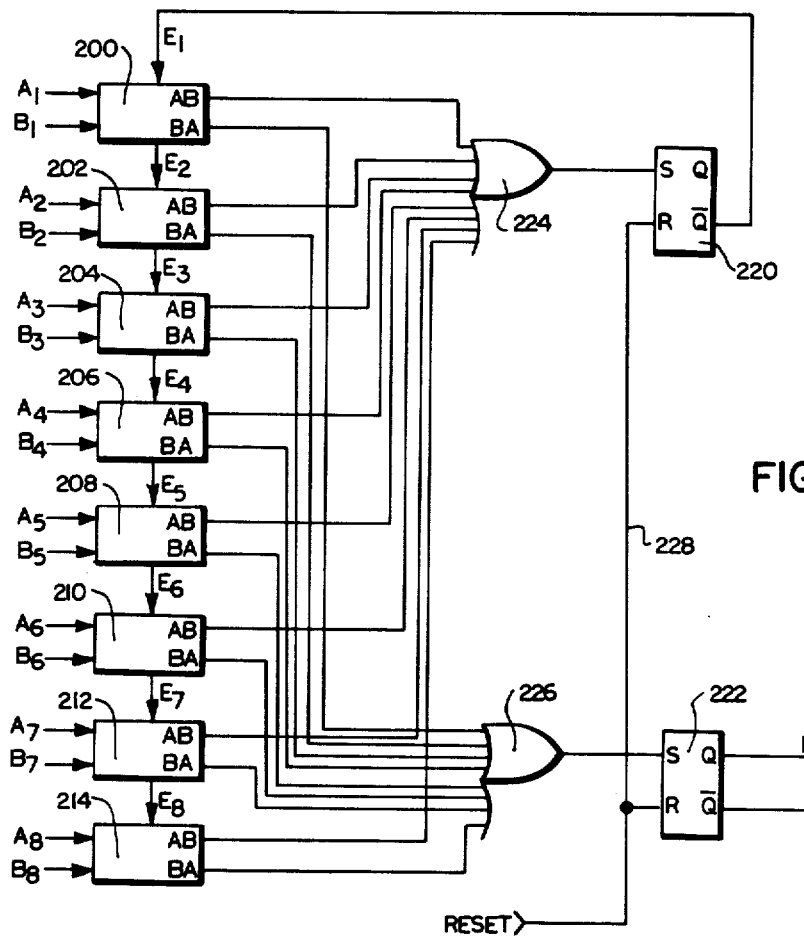
FIG. 10 is a block diagram of a two byte comparator for use in an embodiment which sorts records serially by byte, rather than bit.

FIG. 10 broadly illustrates the form which one of the comparator 54, 56, 58, 60 . . . 62 would take. In this figure, the lines designated $A_1$-$A_8$ will carry the eight bits of the byte then being presented of record A, with the lines designated $B_1$-$B_8$ carrying the corresponding bits of the byte of record B then being presented. $A_1$ and $B_1$ will be the most significant bits, $A_2$ and $B_2$ the second most significant bits, etc. Bit comparator circuits 200-214 each compare corresponding bits of the two records. Each of the comparators 200-214 includes two comparator outputs AB and BA for indicating the relative magnitudes of the bits presented thereto. Thus, if input $A_1$ has a high value and input $B_1$ has a low value, then output line AB will be high and output BA will be low. Similarly, if the input line $B_1$ has a high logic level applied thereto when input line $A_1$ is low, then the output line BA will be high, whereas output line AB will be low. Both of the output lines AB and BA, however, will be low when the two input signals are equal (i.e., both high or both low).

In addition, each of the bit comparator circuits 200-214 includes an enable input and an enable output. The various output lines AB and BA of each comparator circuit will respond as described above only if the enable input into that comparator circuit is at a high logic level. If that enable input is at a low logic level, however, the outputs will be forced into a low logic level. The enable output generated by each bit comparator circuit 200-214 will be at a high logic level only if the enable input into that comparator circuit is also at a high logic level, and the two inputs into that bit comparator circuit are equal.

Because of this, if any one of the enable lines $E_1$-$E_8$ is at a low logic level, then all succeeding enable lines will also be low. Hence, if the enable input $E_1$ into comparator circuit 200 is at a low logic level, then all of the other enable lines $E_2$-$E_8$ will also be at a low logic level, hence all of comparator circuits 200-214 will be disabled and all of the outputs AB and BA will be forced into a low logic level.

The various AB and BA outputs are gated to two RS flip-flops 220 and 222 which respectively serve the same function as flip-flops 140 and 142 in the two input comparator circuit of FIG. 6. Thus, flip-flop 222 provides outputs identifying which of the two input bytes is greater, whereas flip-flop 220 operates to disable the comparator circuit from changing states when a comparison is decided.

Prior to the initiation of a sorting operation, a pulse will be applied along a reset line 228 to the reset inputs of both flip-flops 220 and 222. Consequently, flip-flop 222 will be reset into a state where its Q output (line BA) is low, and its $\bar{Q}$ output (line AB) is high. Similarly, the $\bar{Q}$ output of flip-flop 220 will be reset to a high logic level, thereby providing an enabling input (high logic level) into the enable input $E_1$ of comparator 200.

In operation, the comparator of FIG. 10 functions in much the same way as the comparator of FIG. 6, with the comparison determination depending upon the time sequence in which high logic level signals are applied to the set inputs of flip-flops 220 and 222. If a high level signal is first applied to the set input of flip-flop 220, then the $\bar{Q}$ output thereof will shift to a low logic level, thereby disabling the comparison circuit and preventing a high level signal from appearing at the set input of flip-flop 222. Flip-flop 222 is thereby locked into the state in which it was initially reset, i.e., indicating that the input byte A has a greater magnitude than the input byte B.

If a high level signal appears initially at the set input to flip-flop 222, however, then the outputs AB and BA will exchange states, whereby the output BA is now at a high level, indicating that the record B has the greater key. As before, the flip-flop 222 will remain locked in this state until reset by a pulse applied to the reset line 228 at a subsequent time, just prior to the application of the first bytes of the keys of the next records to be sorted.

To understand this better, consider the example utilized to describe FIG. 1. Thus, presume that the byte applied to lines $A_1$-$A_8$ is "11000001", and the byte applied to input lines $B_1$-$B_8$ is "11001001". In this case, bit $A_1$ and $B_1$ are equal, hence the high enable signal will descend from comparator 200 to comparator 202. Bits $A_2$ and $B_2$ are also equal, however, hence the enable signal will descend once more to comparator 204. Since the third and fourth bits of bytes A and B are similarly equal, the enable signal will descend through comparator circuits 204 and 206 and will be applied to comparator 208. The fifth bits of the two bytes are not equal. Consequently, the enable signal generated by comparator 208 will remain low, thus disabling comparator 210, 212 and 214. Also, the output line BA of comparator circuit 208 will shift to a high logic level, since the fifth bit of the B byte is greater than the fifth bit of the A byte. This high signal will be transmitted through OR gate 226 to the set input of flip-flop 222, thereby setting this flip-flop into the state indicating that the record B has the greater key of the two records. Flip-flop 222 will then remain in the set condition until reset just prior to the initiation of another sorting operation.

Figure 11:
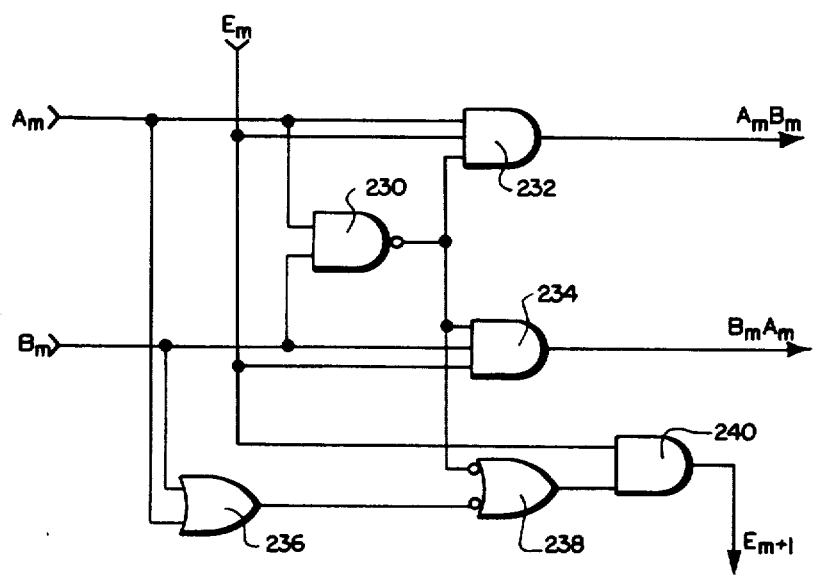
FIG. 11 is a more detailed logic diagram of a portion of the two byte comparator of FIG. 10.

FIG. 11 illustrates one form which each of the comparators 200–214 could take. In this figure, the NAND gate 230 and the AND gates 232 and 234 serve essentially the same functions as NAND gate 134 and AND gates 136 and 138, respectively, serve for the comparator of FIG. 6. Thus, the output of NAND gate 230 will drop to a low logic level when both inputs are high, disabling the transmission of these high logic levels to the output lines of the comparator. A third input into each of the AND gates 232 and 234 is connected to the enable output from the preceding bit comparator stage. Thus, unless this enable input is high, the outputs from this comparator will be forced to a low logic level. The remaining circuitry, comprised of OR gate 236, NAND gates 238 and AND gate 240, generate the enable output signal used to control the next succeeding comparator circuit. OR gate 236 will provide a low logic level output only when both input signals are at a low logic level. The output of OR gate 236 and the output of NAND gate 230 are joined in a NAND gate 238, which functions as an OR gate with negated inputs. Thus, the output to gate 238 will be at a high logic level only if one of the two inputs thereto is at a low logic level, i.e., only if the inputs $A_n$ and $B_n$ to the comparator circuit are both high (in which case the output of NAND gate 230 will be at a low logic level) or both low (in which case the output of OR gate 236 will be at a low logic level). Gate 240 "ands" the output of gate 238 with the enable input from the preceding stage, thereby disabling the application of an enable signal to a subsequent stage unless the enable input to that stage is also high.

As stated previously, the record gates used in the decoders 64, 66 ... 68 (FIG. 3) must also operate to gate eight bit bytes, rather than a single bit at a time, as in previous embodiments.

Figure 12:
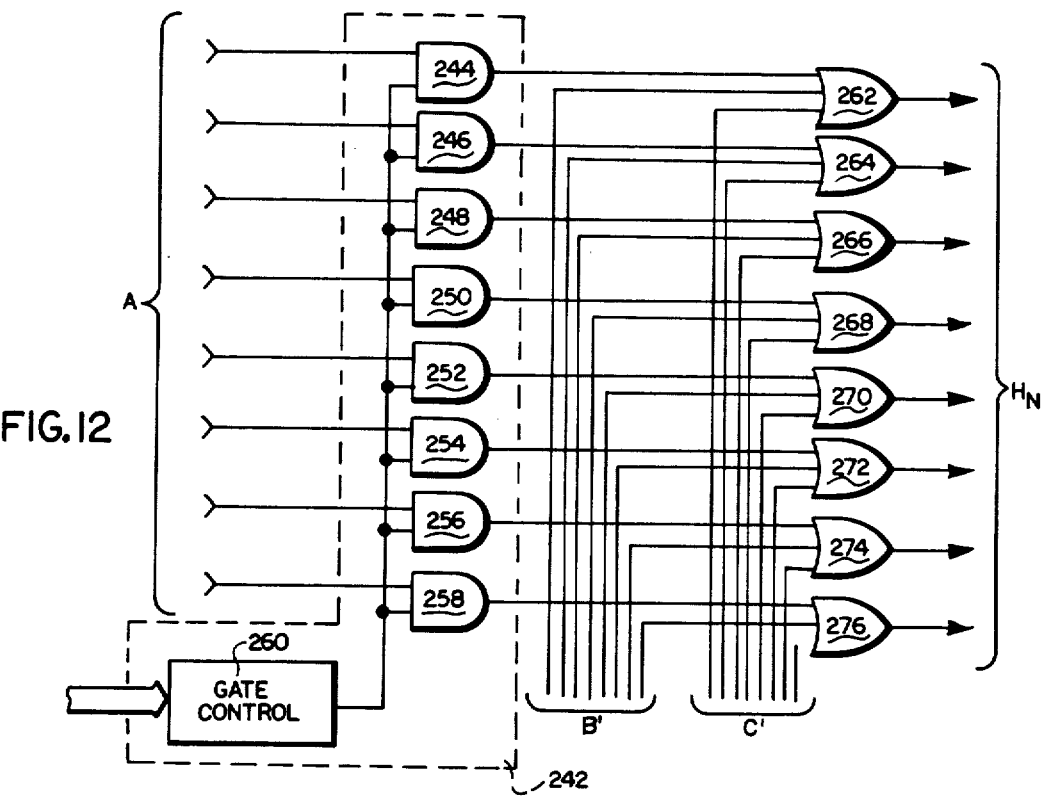
FIG. 12 is a block diagram of a portion of the gating network for use in a three input, serial by byte embodiment; and, FIG. 13 is a detailed logic diagram of the gate control circuits for use in controlling the gates of a three input, serial by byte embodiment.

FIG. 12 broadly illustrates one form which the record gates could take in a three line sorter module, such as that shown in FIG. 5, but for sorting records by byte. In this figure, the circuit 242 corresponds to the $X_1$ gate 70 of FIG. 3. This circuit 242 includes eight AND gates 244–258 which serve to effectively pass or block the eight bits of one byte of a record being sorted (in FIG. 12, record A). These AND gates 244–258 are controlled by a gate control circuit 260. Gate control circuit 260 has for its input the outputs of each of the comparators which compare the byte of each record with the byte of each other records. Based upon these comparator outputs, the gate control 260 determines whether or not the record being serviced by those AND gates is the Nth highest record. If it is, then the output of gate control circuit 260 will shift to a high logic level, enabling all of AND gates 244–258 and permitting the A record byte to be transmitted to the $H_n$ output via OR gates 262–276. Similarly, if gate control 260 determines that record A is not the Nth highest record, then the output thereof will be at a low logic level, disabling all of gates 244–258 and preventing the A record from being transmitted to OR gates 262–276.

The OR gates 262–276 combine the outputs of each of the record gates (such as the record gate 242) for all N records. In FIG. 12, OR gates 262–276 are illustrated as having three inputs, thereby being, in this example, specifically adapted for the situation in which the sorter sorts three records simultaneously. One input to each of the OR gates 262–276 is derived from the output (B') of the B record gate, whereas the third input to each of the OR gates 262–276 is derived from the outputs (C') of the C record gate.

In a system for sorting N records serially by byte, each of the decoders such as decoder 64, 66 ... 68 of FIG. 3 will include N record gates 242 and one set of OR gates such as OR gates 262–276. Each OR gate will have N inputs, one derived from each of the N record gates 242. In each decoder, one and only one of the record gates would be enabled at any given time, thereby permitting only a single one of the N records to be gated to the output $H_n$ of that decoder. Since there are N gate control circuits for each decoder, and there are N decoders, there will be a total of $N_2$ gate control circuits.

Figure 13:
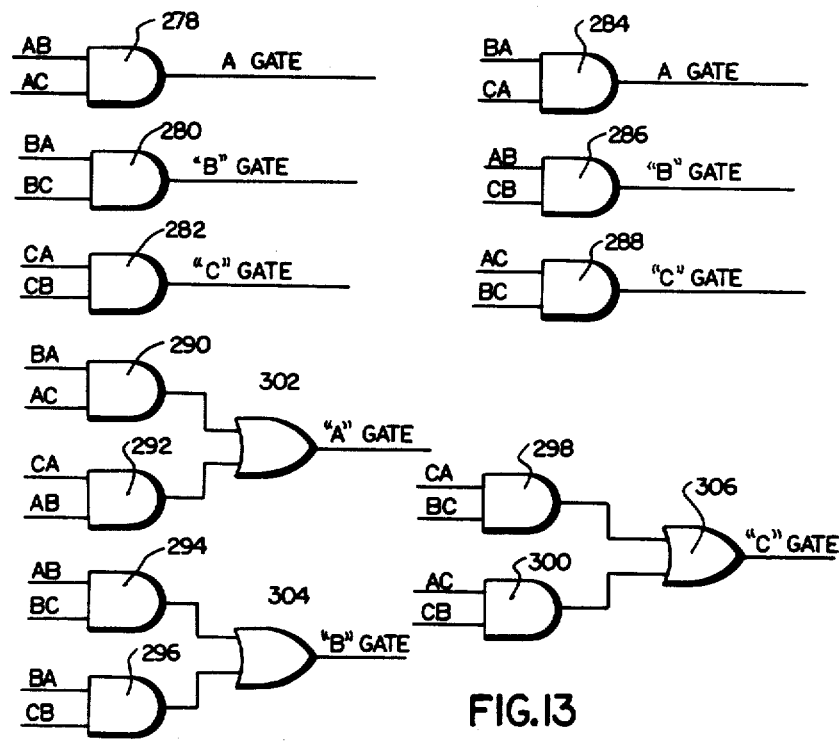

For the situation in which three records are to be sorted serially by byte, nine different gate control circuits must be provided. For exemplary purposes, FIG. 13 illustrates these nine different gate control circuits. The three gate control circuits for the first highest decoder will each comprise only a single AND gate 278, 280 and 282. Similarly, the three gate control circuits used in the third highest decoder will each comprise only a single AND gate 284, 286 and 288. The gate control circuits for the second highest decoder will have a more complicated form, however. This is because, as described previously, there are two different conditions under which each of the records may be the second highest record. As illustrated in FIG. 13, each of these three gate control circuits comprises two AND gates 290, 292; 294, 296; and 298, 300; together with a corresponding OR gate 302–306 for joining the outputs of the corresponding two AND gates. The manner of selection of the input signals for the various logic gates of the gate control circuits has been described previously in the description of the circuitry of FIG. 5, and will not be repeated herein.

Terminology

When used hereinafter in connection with three input sorters such as the sorter of FIG. 5, the term "initial state"($S_O$) should be understood to refer to the state of the sorting circuitry after reset. The term "first-level state" ($S_{11}$–$S_{16}$), on the other hand, should be understood to refer to the state of the circuitry when the highest record or lowest record has been identified but the relative order of the other two records has not yet been determined, while the term "second-level state" ($S_{21}$–$S_{26}$) should be understood to refer to the state of the circuitry after the relative order of all three records has been finally determined. Thus, as the three records are serially presented, the circuitry proceeds from an initial state to a first-level state, and then to a second-level state. The circuit remains in the second-level state until reset prior to the presentation of the next records.

The "state" of the FIG. 5 sorter is indicated by the logic values of the flip-flops 140, 142 (FIG. 6) associated with each of the three comparators 82, 84, and 86. The initial state, six first-level states, and six second-level states are represented by the outputs of the flip-flops as follows:

STATE TABLE

| State | A:B (82) F/F 140 | A:B (82) F/F 142 | A:C (84) F/F 140 | A:C (84) F/F 142 | B:C (86) F/F 140 | B:C (86) F/F 142 | ABC |
|---|---|---|---|---|---|---|---|
| $S_0$ | 0 | 0 | 0 | 0 | 0 | 0 | 000 or 111 |
| $S_{11}$ | 0 | 0 | 0 | 1 | 0 | 1 | 001 |
| $S_{12}$ | 0 | 1 | 0 | 1 | 0 | 0 | 011 |
| $S_{13}$ | 0 | 1 | 0 | 0 | 1 | 0 | 010 |
| $S_{14}$ | 0 | 0 | 1 | 0 | 1 | 0 | 110 |
| $S_{15}$ | 1 | 0 | 1 | 0 | 0 | 0 | 100 |
| $S_{16}$ | 1 | 0 | 0 | 0 | 0 | 1 | 101 |
| | | | | | | | From-To |
| $S_{21}$ | X | 1 | X | 1 | X | 1 | 011-X01 001-01X |
| $S_{22}$ | X | 1 | X | 1 | 1 | 0 | 010-0X1 011-X10 |
| $S_{23}$ | X | 1 | 1 | 0 | 1 | 0 | 010-1X0 110-01X |
| $S_{24}$ | 1 | 0 | 1 | 0 | 1 | 0 | 110-10X 100-X10 |
| $S_{25}$ | 1 | 0 | 1 | 0 | X | 1 | 100-X01 101-1X0 |
| $S_{26}$ | 1 | 0 | X | 1 | X | 1 | 101-0X1 001-10X |

X = don't care.

Although the invention has been described with respect to preferred embodiments, it will be appreciated that various rearrangements and alterations of parts may be made without departing from the spirit and scope of the present invention, as defined in the appended claims.

What is claimed is:

1. A sorting circuit for sorting three input values into first through third ascendingly ordered output values, said input values being represented by three input sequences, respectively, siad first through said third output values being represented by first through third output sequences, respectively, each of said input and said output sequences being a time sequence having a prescribed number of binary bits arranged from the most significant bit to the least significant bit, said input and said output sequences thereby having corresponding bits each binary bit having either of a logic "0" and a logic "1" level at a time, said sorting circuit comprising:

state specifying means for specifying any one of an initial state, six first-level states, and six second-level states at a time, each first-level state being accompanied by two second-level states with said two second-level states assigned to two first-level states including said each first-level state, respectively, so that each second-level state may indicate a particular order among said input values, said initial state being a state in which the order of said input values is not yet definite, each first-level state being another state in which the order is determined for only one input value, each of the two second-level states accompanying the last-mentioned first-level state being still another state in which the order is determined for two input values except for said only one input value;

means for resetting said state specifying means into said initial state;

checking and driving means coupled to said state specifying means for checking three corresponding bits of the respective input sequences from time to time to drive, when only one bit is checked to have one of the logic "0" and the logic "1" levels with the two binary bits corresponding thereto checked to have the other of the logic "0" and the logic "1" level for the first time after said state specifying means is reset into said initial state, said state specifying means from said initial state to one of said first-level states that is predetermined according to the input sequence in which said only one bit is present, said checking and driving means subsequently driving said state specifying means from said one first-level state to one of the two second-level states accompanying said one first-level state when a particular bit and the binary bit corresponding thereto of two input sequences except for the input sequence in which said only one bit is present are checked to have a predetermined one and the other of the logic "0" and the logic "1" levels, respectively, for the first time after said state specifying means is driven to said one first-level state; and an output circuit coupled to said state specifying means for arranging said input sequences into said first through said third output sequences according to said initial state, said one first-level state, and said one second-level state.

2. A sorting circuit as claimed in claim 1, wherein said output circuit comprises output producing means responsive to each of said initial, said first-level, and said second-level states for producing as said first output sequence a first cf said input sequences in which only one bit is present, for producing as said second output sequence a second of said irput sequences in which the logic "0" leve is had by one of said particular bit and the binary bit corresponding thereto, and for producing as said third output sequence a third of said input sequences in which the logic "1" level is had by the other of said particular bit and the binary bit correspondirg thereto, when said only one bit has the logic "0" leve, said output producing means producing said third, said second, and said first input sequences as said first through said third output sequences, respectively, when said only one bit has the logic "1" level.

3. A sorting circuit as claimed in claim 2, wherein:
said state specifying means comprises level giving means for giving the logic "1" level to an initial-state signal $S_O$ when said state specifying means is put in said initial state, a first first-level signal $S_{11}$ when one input valve $X_1$ and another input value $X_2$ are smaller than still another input value $X_3$, a second first-level signal $S_{12}$ when the input value $X_1$ is the smallest of said three input sequences, a third first-level signal $S_{13}$ when the input value $X_2$ is the largest of said three input sequences, a fourth first-level signal $S_{14}$ when the input value $X_3$ is the smallest of said three input sequences, a fifth first-level signal $S_{15}$ when the input vlaue $X_1$ is the largest of said three input sequences, a sixth first-level signal $S_{16}$ when the input value $X_2$ is the smallest of said three input sequences, a first second-level signal $S_{21}$ when the input values $X_3$ and $X_1$ are greater and smaller than the input value $X_2$, respectively, a second second-level signal $S_{22}$ when the input values $X_1$ and $X_2$ are smaller and greater than the input value $X_3$, respectively, a third second-level signal $S_{23}$ when the input values $X_2$ and $X_3$ are greater and smaller than the input value $X_1$, respectively, a fourth second-level signal $S_{24}$ when the input values $X_3$ and $X_1$ are smaller and greater than the input value $X_2$, respectively, a fifth second-level signal $S_{25}$ when the input values $X_1$ and $X_2$ are greater and smaller than the input value $X_3$, respectively, and a sixth second-level signal $S_{26}$ when the input values $X_2$ and $X_3$ are smaller and greater than the input value $X_1$, respectively, said level giving means otherwise giving the logic "0" level to said initial-state, said first-level, and said second-level signals; said output producing means comprising means supplied with said input sequences and said initial-state, said first-level, and said second-level signals for producing corresponding input sequence bits $x_1$, $x_2$, and $x_3$ for the respective input value $X_1$, $X_2$, $X_3$ as corresponding bits $Y_1$, $Y_2$, and $Y_3$ of said first through said third output sequences according to logic forumulae:

$$y_1 = x_1 x_2 x_3 S_0 + x_1 x_2 S_{11} x_2 x_3 S_{15} + x_3 x_1 S_{13} + x_1(S_{12} + S_{21} S_{22}) +$$
$$x_2(S_{16} + S_{25} + S_{26}) + x_3(S_{14} + S_{23} + S_{24}),$$

$$y_2 = x_1 x_2(S_0 + S_{14}) + x_2 x_3(S_0 + S_{12}) + x_3 x_1(S_0 + S_{16}) + x_1(S_{11} +$$
$$S_{13} + S_{23} + S_{26}) + x_2(S_{11} + S_{15} + S_{21} + S_{24}) + x_3(S_{13} + S_{15} +$$
$$S_{22} + S_{25}),$$

and $$y_3 = x_1(S_0 + S_{14} + S_{15} + S_{16} + S_{24} + S_{25}) + x_2(S_0 + S_{12} + S_{13} +$$
$$S_{14} + S_{22} + S_{23}) + x_3(S_0 + S_{11} + S_{12} + S_{16} + S_{21} + S_{26}).$$

* * * * *